United States Patent [19]

Kaplan

[11] 3,890,715

[45] June 24, 1975

[54] DEVICE FOR MEASURING ADVERTISING SPACE

[76] Inventor: Arthur R. Kaplan, 20 E. Delaware, Chicago, Ill. 60611

[22] Filed: Aug. 27, 1973

[21] Appl. No.: 392,075

[52] U.S. Cl. .................................. 33/1 B; 33/121
[51] Int. Cl. ...................... G01b 5/26; G06g 1/00
[58] Field of Search .................... 33/1 B, 121, 184.5

[56] References Cited
UNITED STATES PATENTS

| | | | |
|---|---|---|---|
| 1,369,833 | 3/1921 | Murphy | 33/1 B |
| 2,098,323 | 11/1937 | Wadsworth | 33/1 B |
| 2,747,795 | 5/1956 | Kreuttmer | 33/1 B |
| 2,770,044 | 11/1956 | Wood | 33/121 |
| 3,377,707 | 4/1961 | Breese | 33/1 B |

*Primary Examiner*—Richard L. Aegerter
*Assistant Examiner*—A. J. Mirabito
*Attorney, Agent, or Firm*—Fitch, Even, Tabin & Luedeka

[57] ABSTRACT

A device is provided for directly reading the area of a newspaper ad in either agate lines or column inches. An upper locating line on a transparent sheet of the device is aligned with the top of the ad and a left-hand column line is aligned with the left vertical edge of the ad. A series of spaced vertical lines define columns and a series of intersecting transverse lines define therewith areas containing indicia. An indicia in the area superimposed over the lower right-hand corner of the ad provides a reading of the ad area in agate lines and/or column inches.

4 Claims, 4 Drawing Figures

FIG. 4

| INCHES | (AGATE LINES) | INCHES | (AGATE LINES) | INCHES | (AGATE LINES) | INCHES | (AGATE LINES) | INCHES | (AGATE LINES) | INCHES | (AGATE LINES) | INCHES | (AGATE LINES) | INCHES | (AGATE LINES) |
|---|---|---|---|---|---|---|---|---|---|---|---|---|---|---|---|
| 1/4 | (3½) | ½ | (7) | ¾ | (10½) | 1 | (14) | 1¼ | (17½) | 1½ | (21) | 1¾ | (24½) | 2 | (28) |
| ½ | (7) | 1 | (14) | 1½ | (21) | 2 | (28) | 2½ | (35) | 3 | (42) | 3½ | (49) | 4 | (56) |
| ¾ | (10½) | 1½ | (21) | 2¼ | (31½) | 3 | (42) | 3¾ | (52½) | 4½ | (63) | 5¼ | (73½) | 6 | (84) |
| 1 | (14) | 2 | (28) | 3 | (42) | 4 | (56) | 5 | (70) | 6 | (84) | 7 | (98) | 8 | (112) |
| 1¼ | (17½) | 2½ | (35) | 3¾ | (52½) | 5 | (70) | 6¼ | (87½) | 7½ | (105) | 8¾ | (122½) | 10 | (140) |
| 1½ | (21) | 3 | (42) | 4½ | (63) | 6 | (84) | 7½ | (105) | 9 | (126) | 10½ | (147) | 12 | (168) |
| 1¾ | (24½) | 3½ | (49) | 5¼ | (73½) | 7 | (98) | 8¾ | (122½) | 10½ | (147) | 12¼ | (171½) | 14 | (196) |
| 2 | (28) | 4 | (56) | 6 | (84) | 8 | (112) | 10 | (140) | 12 | (168) | 14 | (196) | 16 | (224) |
| 2¼ | (31½) | 4½ | (63) | 6¾ | (94½) | 9 | (126) | 11¼ | (157½) | 13½ | (189) | 15¾ | (220½) | 18 | (252) |
| 2½ | (35) | 5 | (70) | 7½ | (105) | 10 | (140) | 12½ | (175) | 15 | (210) | 17½ | (245) | 20 | (280) |
| 2¾ | (38½) | 5½ | (77) | 8¼ | (115½) | 11 | (154) | 13¾ | (192½) | 16½ | (231) | 19¼ | (269½) | 22 | (308) |
| 3 | (42) | 6 | (84) | 9 | (126) | 12 | (168) | 15 | (210) | 18 | (252) | 21 | (294) | 24 | (336) |
| 3¼ | (45½) | 6½ | (91) | 9¾ | (136½) | 13 | (182) | 16¼ | (227½) | 19½ | (273) | 22¾ | (318½) | 26 | (364) |
| 3½ | (49) | 7 | (98) | 10½ | (147) | 14 | (196) | 17½ | (245) | 21 | (294) | 24½ | (343) | 28 | (392) |
| 3¾ | (52½) | 7½ | (105) | 11¼ | (157½) | 15 | (210) | 18¾ | (262½) | 22½ | (315) | 26¼ | (367½) | 30 | (420) |
| 4 | (56) | 8 | (112) | 12 | (168) | 16 | (224) | 20 | (280) | 24 | (336) | 28 | (392) | 32 | (448) |
| 4¼ | (59½) | 8½ | (119) | 12¾ | (178½) | 17 | (238) | 21¼ | (297½) | 25½ | (357) | 29¾ | (416½) | 34 | (476) |
| 4½ | (63) | 9 | (126) | 13½ | (189) | 18 | (252) | 22½ | (315) | 27 | (378) | 31½ | (441) | 36 | (504) |
| 4¾ | (66½) | 9½ | (133) | 14¼ | (199½) | 19 | (266) | 23¾ | (332½) | 28½ | (399) | 33¼ | (465½) | 38 | (532) |
| 5 | (70) | 10 | (140) | 15 | (210) | 20 | (280) | 25 | (350) | 30 | (420) | 35 | (490) | 40 | (560) |
| 5¼ | (73½) | 10½ | (147) | 15¾ | (220½) | 21 | (294) | 26¼ | (367½) | 31½ | (441) | 36¾ | (514½) | 42 | (588) |
| 5½ | (77) | 11 | (154) | 16½ | (231) | 22 | (308) | 27½ | (385) | 33 | (462) | 38½ | (539) | 44 | (616) |
| 5¾ | (80½) | 11½ | (161) | 17¼ | (241½) | 23 | (322) | 28¾ | (402½) | 34½ | (483) | 40¼ | (563½) | 46 | (644) |
| 6 | (84) | 12 | (168) | 18 | (252) | 24 | (336) | 30 | (420) | 36 | (504) | 42 | (588) | 48 | (672) |
| 6¼ | (87½) | 12½ | (175) | 18¾ | (262½) | 25 | (350) | 31¼ | (437½) | 37½ | (525) | 43¾ | (612½) | 50 | (700) |
| 6½ | (91) | 13 | (182) | 19½ | (273) | 26 | (364) | 32½ | (455) | 39 | (546) | 45½ | (637) | 52 | (728) |
| 6¾ | (94½) | 13½ | (189) | 20¼ | (283½) | 27 | (378) | 33¾ | (472½) | 40½ | (567) | 47¼ | (661½) | 54 | (756) |
| 7 | (98) | 14 | (196) | 21 | (294) | 28 | (392) | 35 | (490) | 42 | (588) | 49 | (686) | 56 | (784) |
| 7¼ | (101½) | 14½ | (203) | 21¾ | (304½) | 29 | (406) | 36¼ | (507½) | 43½ | (609) | 50¾ | (710½) | 58 | (812) |
| 7½ | (105) | 15 | (210) | 22½ | (315) | 30 | (420) | 37½ | (525) | 45 | (630) | 52½ | (735) | 60 | (840) |
| 7¾ | (108½) | 15½ | (217) | 23¼ | (325½) | 31 | (434) | 38¾ | (542½) | 46½ | (651) | 54¼ | (759½) | 62 | (868) |
| 8 | (112) | 16 | (224) | 24 | (336) | 32 | (448) | 40 | (560) | 48 | (672) | 56 | (784) | 64 | (896) |
| 8¼ | (115½) | 16½ | (231) | 24¾ | (346½) | 33 | (462) | 41¼ | (577½) | 49½ | (693) | 57¾ | (808½) | 66 | (924) |
| 8½ | (119) | 17 | (238) | 25½ | (357) | 34 | (476) | 42½ | (595) | 51 | (714) | 59½ | (833) | 68 | (952) |
| 8¾ | (122½) | 17½ | (245) | 26¼ | (367½) | 35 | (490) | 43¾ | (612½) | 52½ | (735) | 61¼ | (857½) | 70 | (980) |
| 9 | (126) | 18 | (252) | 27 | (378) | 36 | (504) | 45 | (630) | 54 | (756) | 63 | (882) | 72 | (1008) |
| 9¼ | (129½) | 18½ | (259) | 27¾ | (388½) | 37 | (518) | 46¼ | (647½) | 55½ | (777) | 64¾ | (906½) | 74 | (1036) |
| 9½ | (133) | 19 | (266) | 28½ | (399) | 38 | (532) | 47½ | (665) | 57 | (798) | 66½ | (931) | 76 | (1064) |
| 9¾ | (136½) | 19½ | (273) | 29¼ | (409½) | 39 | (546) | 48¾ | (682½) | 58½ | (819) | 68¼ | (955½) | 78 | (1092) |
| 10 | (140) | 20 | (280) | 30 | (420) | 40 | (560) | 50 | (700) | 60 | (840) | 70 | (980) | 80 | (1120) |
| 10¼ | (143½) | 20½ | (287) | 30¾ | (430½) | 41 | (574) | 51¼ | (717½) | 61½ | (861) | 71¾ | (1004½) | 82 | (1148) |
| 10½ | (147) | 21 | (294) | 31½ | (441) | 42 | (588) | 52½ | (735) | 63 | (882) | 73½ | (1029) | 84 | (1176) |
| 10¾ | (150½) | 21½ | (301) | 32¼ | (451½) | 43 | (602) | 53¾ | (752½) | 64½ | (903) | 75¼ | (1053½) | 86 | (1204) |
| 11 | (154) | 22 | (308) | 33 | (462) | 44 | (616) | 55 | (770) | 66 | (924) | 77 | (1078) | 88 | (1232) |
| 11¼ | (157½) | 22½ | (315) | 33¾ | (472½) | 45 | (630) | 56¼ | (787½) | 67½ | (945) | 78¾ | (1102½) | 90 | (1260) |
| 11½ | (161) | 23 | (322) | 34½ | (483) | 46 | (644) | 57½ | (805) | 69 | (966) | 80½ | (1127) | 92 | (1288) |
| 11¾ | (164½) | 23½ | (329) | 35¼ | (493½) | 47 | (658) | 58¾ | (822½) | 70½ | (987) | 82¼ | (1151½) | 94 | (1316) |
| 12 | (168) | 24 | (336) | 36 | (504) | 48 | (672) | 60 | (840) | 72 | (1008) | 84 | (1176) | 96 | (1344) |
| 12¼ | (171½) | 24½ | (343) | 36¾ | (514½) | 49 | (686) | 61¼ | (857½) | 73½ | (1029) | 85¾ | (1200½) | 98 | (1372) |
| 12½ | (175) | 25 | (350) | 37½ | (525) | 50 | (700) | 62½ | (875) | 75 | (1050) | 87½ | (1225) | 100 | (1400) |
| 12¾ | (178½) | 25½ | (357) | 38¼ | (535½) | 51 | (714) | 63¾ | (892½) | 76½ | (1071) | 89¼ | (1249½) | 102 | (1428) |
| 13 | (182) | 26 | (364) | 39 | (546) | 52 | (728) | 65 | (910) | 78 | (1092) | 91 | (1274) | 104 | (1456) |
| 13¼ | (185½) | 26½ | (371) | 39¾ | (556½) | 53 | (742) | 66¼ | (927½) | 79½ | (1113) | 92¾ | (1298½) | 106 | (1484) |
| 13½ | (189) | 27 | (378) | 40½ | (567) | 54 | (756) | 67½ | (945) | 81 | (1134) | 94½ | (1323) | | |
| 13¾ | (192½) | 27½ | (385) | 41¼ | (577½) | 55 | (770) | | | | | | | | |

DEVICE FOR MEASURING ADVERTISING SPACE

This invention relates to an area measurement device and more particularly to a newspaper ad measuring device.

The area of a newspaper ad is commonly measured in either one of two different ways. The first way is an agate line measurement, a 1/14th of an inch vertically in a column being an agate line space. To measure a newspaper ad in agate lines, the number of agate lines vertically in one column is multiplied by the number of columns horizontally to provide the resultant product area of the ad in agate lines. A special ruler is normally used which is marked in 1/14th inch intervals to measure agate lines. The width of a standard newspaper ad column is about 1¾ to 1⅞th inches and the agate ruler may also be provided with special column markings thereon at 1¾ inches to facilitate counting the number of columns. After measuring the number of agate lines and the number of columns, the person multiplies the number of columns and number of agate lines to obtain the agate lines area of the ad. Both of these ruler measurements and particularly the multiplication thereof are sources of human error.

The second method of ad measurement is generally the same as above-described except that an inch ruler is used having markings thereon at 1/16th of an inch. This ruler may also have column marks thereon at 1¾ to 1⅞th inch intervals. The product of the number of columns and the vertical length of the column in inches provides the measurements of the ad or the ad space in column inches. Both of the above-described processes are slow and result in considerable calculations in which human errors are bound to occur. Moreover, confusion is often caused, when persons must use and shift between the column inches and agate lines measurements for different newspapers and in trying to convert quickly from one system to the other.

The measurement of ads is further complicated by the fact that newspapers are also printed in tabloid form or regular size and that the length of the paper may vary, usually from about 294 agate lines to 315 agate lines. Within such differing areas, illustrators are often asked to provide art work for an ad area usually stated in column inches or agate lines. It is particularly difficult for illustrators to visualize the various shapes that the area may take. With the present invention, however, it is a simple matter to visualize the several shapes available for the ad depending upon the number of columns used for the ad.

Ads are measured by many people including persons working for the advertising agency, the newspaper, the advertiser, and organizations verifying the ad and its size. Therefore, a definite need exists for the elimination of errors and the reduction of time and cost involved in ad measuring.

Accordingly, a general object of the invention is to provide a measuring device for measuring newspaper ad areas more quickly and efficiently than with the presently used rulers.

Other objects and advantages of the invention will become apparent from the following detailed description taken in connection with the drawings in which:

FIG. 4 is another embodiment of the invention for measuring an ad in either agate lines or column inches.

Figure 1:
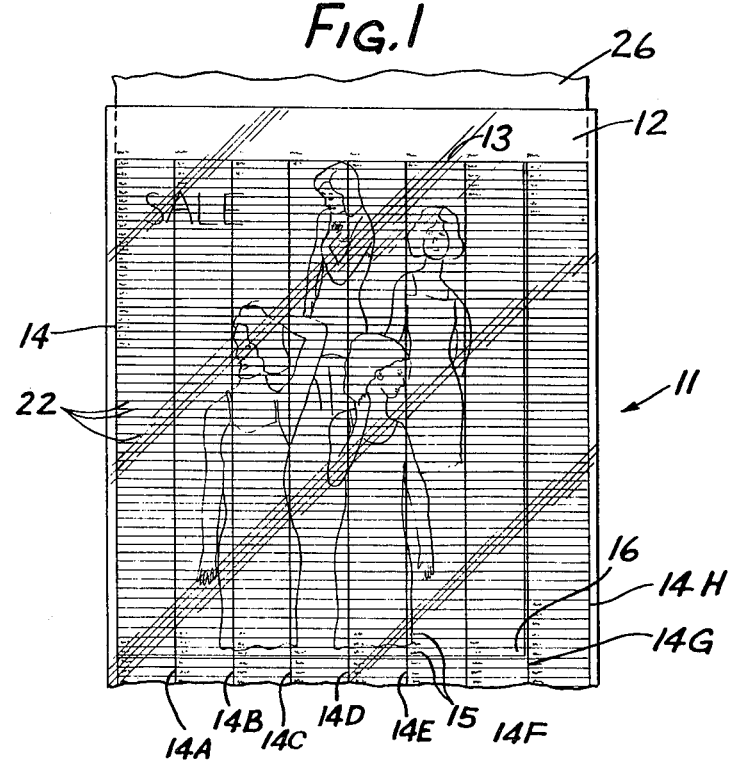
FIG. 1 is a perspective view showing the ad measuring device being used to measure an ad.

As shown in the drawings for purposes of illustration, the invention is embodied in a newspaper ad measuring device 11 comprising a transparent sheet 12 which can be placed directly over a newspaper 16 in such a manner that the area of the add may be read directly in the appropriate measurement of either agate lines or column inches. More specifically, as shown in FIG. 1, the device is provided with an upper locating line 13 for alignment with the top of the ad and a left-hand column line 14, which is substantially perpendicular to the top line 13, for alignment with the left vertical edge of the ad. With the device so aligned and flat on the ad, the lower right-hand corner of the ad is located and an indicia 15 is read at the area on the device superimposed over the lower left-hand corner of the ad. Thus, it will be seen that to measure a given ad, the device 11 is placed directly over the ad, aligned, and the indicia 15 in a space or area 16 superimposed over the lower right-hand corner of the ad is the ad space measurement. In some instances, as best seen in FIG. 4, the device is provided with two sets of indicia, one set of indicia reading in agate lines and the other set of indicia reading in column inches. In each instance, each indicia is the product of the number of columns and the number of lines, either in 4ths of an inch for the line inches product, or 14ths of an inch for agate line product.

The invention also assists artists, layout people, illustrators or the like to visualize the different shapes of spaces they may use for a given ad area measurement. For example, if one illustrator is given 350 agate lines as the space available, the illustrator may use the spaces indicated by reference characters A, B, C, D, E, F and G shown in FIG. 4. For a two-column wide ad, the illustration must be relatively long and narrow in the horizontal direction with the bottom of the ad at A. By looking at the 350 agate line indicia in each of the columns, it is easy to visualize the height and breadth available to the illustrator for this size of space.

Referring now in greater detail to the illustrated embodiment of the invention, it comprises a transparent plastic sheet 12 preferably made of a material such as vinyl about 1/32 of an inch in thickness. The sheet has sufficient bulk or body that it will lie flat on the ad and not cling to the hands of the person using the same as in the manner of very thin flexible wrapping films. Yet, the sheet 12 is very bendable and flexible and it can be readily rolled into a cylinder for convenient storage. The plastic material is sufficiently strong to resist cracking or bending. It will be appreciated that other materials having other characteristics may be used for the sheet 12 and still fall within the purview of the present invention.

The preferred sheet size is sufficient to cover a regular full sized newspaper page, eight columns wide, so that a full page ad or a portion of a page can be readily measured. As tabloid newspapers are shorter and have less width, for example, six columns in width rather than eight columns, the device is readily usable with both tabloid or full length newspapers. The columns are defined between each pair of series of parallel vertical lines 14, 14A, 14B, 14C, 14D, 14E, 14F, 14G and 14H. The columns of a newspaper are usually about 1¾ to 1⅞ inches wide and that width is used herein as the spacing between adjacent column lines. Preferably, the illustrated device is about slightly over 15 inches in width and about 25 inches in length, with a bottom margin and a top margin being provided. The bottom margin of the sheet 12 may contain a set of instructions (not shown) which describe the preferred manner of use of the device and how to align the upper left-hand corner of the device on the ad for reading at the lower right-hand corner of the ad its measurement in line inches or in agate lines, or both. As best seen in FIG. 4, a designation of column inches and agate lines is provided to facilitate the reading of the particular set of column inches or agate lines therebeneath.

The sheet 12 also bears a series of evenly spaced horizontal transverse lines 22 which are preferably located at whole number multiples of a newspaper line height. The lines 22 intersect the column lines 14A–14H to define the grid of spaces or areas 16. In the embodiment of the invention shown in FIG. 2, the transverse lines 22 are spaced at whole number multiples of an agate line, which is 1/14 inch in height. More specifically, the lines 22 of the FIG. 2 embodiment, are spaced at 5 agate lines, i.e., 5/14 inch and hence the indicia 15 read 5, 10, 15, etc., in a downward direction indicating 5 agate lines, 10 agate lines, 15 agate lines, etc. Also, the lines 22 in the left-hand column, i.e., column one of the agate line device of FIG. 2 may be used as a ruler for measuring a space in agate lines. Additionally, small markings may be added to column one to facilitate reading and interpolating the exact number of agate lines between a pair of transverse lines 22. The indicia in column 2 indicate the product of the number of columns and the number of agate lines.

Figure 3:
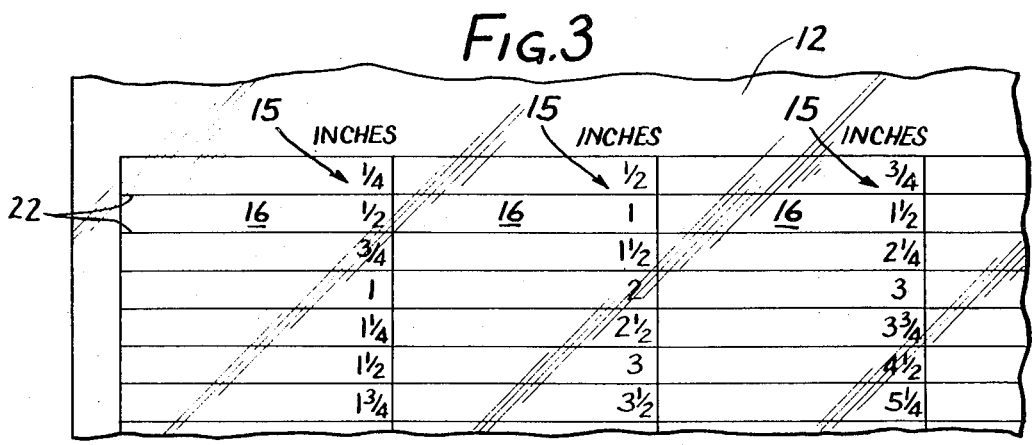
FIG. 3 is a fragmentary plan view of another device for measuring ads in column inches.

In the FIG. 3 embodiment of the invention, the transverse lines 22 are spaced evenly at a predetermined distance from an adjacent line by ¼ inch in this instance. The adjacent areas 16 in the adjacent columns bear indicia 15 indicating the product of indicia in the first column and the number of their respective columns. Column one of the FIG. 3 embodiment may be used as a ruler to measure in ¼ inch increments. The transverse lines 22 may be spaced at other increments and the appropriate indicia placed in the areas 16, if so desired, and still fall within the purview of the invention.

Figure 2:
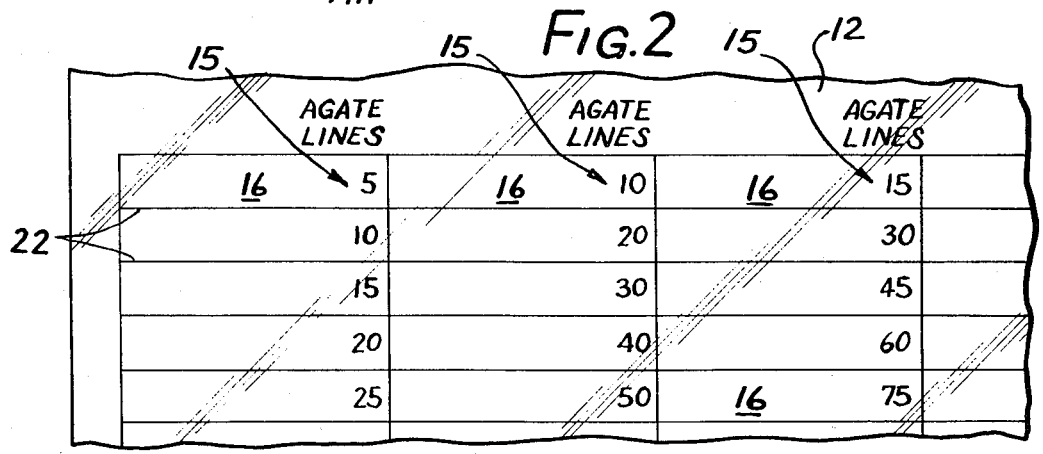
FIG. 2 is a fragmentary plan view of one form of the ad measuring device for measuring agate lines.

The device illustrated in FIG. 4 may be used to measure ad areas in both agate lines and inches. For instance, the number of agate lines is readily seen in the column one, in the set of indicia, 14, 17½, 21, etc., agate lines, and the number of column inches in column one, in the set of indicia, ¼, ½, ¾, etc., column inches. For some instances, it may be preferred to have just agate lines used, as shown in FIG. 2, to avoid fractions of an agate line, such as indicated by the 17½ agate lines indicia in column one.

Newspapers also vary in length from about 294 to 315 agate lines. To provide a more exact reading of the newspapers's length, the lines 22 at the bottom of the sheet 12 may be spaced more closely to provide more accurate readings than the five agate line spacing in the FIG. 2 embodiment or the about three and one-half agate line spacing in the FIG. 4 embodiment of the invention. For instance, agate line readings of 294, 298, 301, 308, 312 and 315 may be provided at the bottom of column one of the FIG. 2 embodiment, at intervals to measure more precisely the length of the ad and hence a more exact ad area measurement.

From the foregoing, it will be seen that the device may be used to quickly measure an ad without multiplication and without taking separate vertical and horizontal measurements as with the prior art methods. The device is easy to use and inexpensive particularly as related to time consuming and costly manual methods now used to measure ads.

What is claimed is:

1. A device for measuring the area of a newspaper ad upon superimposing the device on the ad comprising
   a transparent sheet,
   a series of parallel column lines spaced equally from each other defining newspaper columns, the left one of said column lines being used for locating the sheet along the left side of the ad and another one of said column lines being used for the right-hand boundary of said ad, an upper marginal line on said sheet perpendicular to said column lines to define an upper locating line for locating at the top of the ad, a series of parallel, transverse lines extending perpendicularly to said column lines and being spaced uniformly from each other, said column lines and transverse lines defining a grid work of areas, and indicia in said areas indicating the multiplication product of the transverse lines and number of columns thereby providing an area measurement at the lower right-hand area on said sheet superimposed over the lower right-hand corner of the ad, said transverse lines being spaced at whole number multiples of 1/14th of an inch to provide an area measurement in agate lines.

2. A device in accordance with claim 1 in which the indicia in said areas along the left-hand side of said sheet constitute ruler measurements for the spacing of transverse lines in the leftmost column on said sheet.

3. A device for measuring the area of a newspaper ad upon superimposing the device on the ad comprising
   a transparent sheet,
   a series of parallel column lines spaced equally from each other defining newspaper columns, the left one of said column lines being used for locating the sheet along the left side of the ad and another one of said column lines being used for the right-hand boundary of said ad, an upper marginal line on said sheet perpendicular to said column lines to define an upper locating line for locating at the top of the ad, a series of parallel, transverse lines extending perpendicularly to said column lines and being spaced uniformly from each other, said column lines and transverse lines defining a grid work of areas, and indicia in said areas indicating the multiplication product of the transverse lines and number of columns thereby providing an area measurement at the lower right-hand area on said sheet superimposed over the lower right-hand corner of the ad, two indicia being provided in said areas, one of said indicia providing a line inches measurement and the other one of said indicia providing an agate lines measurement.

4. A device for measuring the area of a newspaper ad upon superimposing the device on the ad comprising
   a transparent sheet,
   a series of parallel column lines spaced equally from each other defining newspaper columns, the left one of said column lines being used for locating the sheet along the left side of the ad and another one of said column lines being used for the right-hand boundary of said ad, an upper marginal line on said sheet perpendicular to said column lines to define an upper locating line for locating at the top of the ad, a series of parallel, transverse lines extending perpendicularly to said column lines and being spaced uniformly from each other, said column lines and transverse lines defining a grid work of areas, and indicia in said areas indicating the multiplication product of the transverse lines and number of columns thereby providing an area measurement at the lower right-hand area on said sheet superimposed over the lower right-hand corner of the ad, said lines being spaced at fractions of a unit of measurement and said indicia providing an area measurement in column units, each of said columns having the indicia designating each column units at the top of each of said columns.

* * * * *